United States Patent
Brogårdh et al.

(10) Patent No.: US 6,836,702 B1
(45) Date of Patent: Dec. 28, 2004

(54) METHOD FOR FINE TUNING OF A ROBOT PROGRAM

(75) Inventors: Torgny Brogårdh, Plårverkagatan (SE); Håkan Brantmark, Snödroppsvägen (SE); Zhongxue Gan, Windsor, CT (US); Gregory Rossano, Enfield, CT (US); Xiongzi Li, West Hartford, CT (US); Yunquan Sun, Storrs, CT (US); Quing Tang, Granby, CT (US)

(73) Assignee: ABB AB, Västerås (SE)

( * ) Notice: Subject to any disclaimer, the term of this patent is extended or adjusted under 35 U.S.C. 154(b) by 21 days.

(21) Appl. No.: 10/458,785

(22) Filed: Jun. 11, 2003

(51) Int. Cl.[7] .............................................. G06F 19/00
(52) U.S. Cl. ..................... 700/245; 700/246; 700/248; 700/259; 700/262; 700/264; 700/254; 318/568.1; 901/48
(58) Field of Search ................................. 700/245, 248, 700/254, 259–260, 262–264; 318/568.11, 568.13, 568.1; 901/1–3, 48; 219/124.34; 703/1, 7

(56) References Cited

U.S. PATENT DOCUMENTS

| | | | | |
|---|---|---|---|---|
| 4,402,053 A | * | 8/1983 | Kelley et al. ................ 700/259 |
| 4,763,276 A | * | 8/1988 | Perreirra et al. ............ 700/262 |
| 5,195,234 A | * | 3/1993 | Pine et al. ..................... 29/720 |
| 5,297,238 A | * | 3/1994 | Wang et al. .................. 700/259 |
| 5,471,312 A | * | 11/1995 | Watanabe et al. ........... 358/296 |
| 5,572,103 A | * | 11/1996 | Terada .................... 318/568.13 |
| 5,675,229 A | * | 10/1997 | Thorne ................... 318/568.11 |
| 5,887,121 A | * | 3/1999 | Funda et al. ................. 700/263 |
| 6,044,308 A | * | 3/2000 | Huissoon ..................... 700/166 |
| 6,198,794 B1 | * | 3/2001 | Peshkin et al. ................ 378/42 |
| 6,226,566 B1 | * | 5/2001 | Funda et al. ................. 700/263 |
| 6,393,340 B2 | * | 5/2002 | Funda et al. ................. 700/263 |
| 6,529,852 B2 | * | 3/2003 | Knoll et al. ................. 702/150 |

FOREIGN PATENT DOCUMENTS

EP          0 549 805 B1 *   7/1993

* cited by examiner

Primary Examiner—Thomas G. Black
Assistant Examiner—McDieunel Marc
(74) Attorney, Agent, or Firm—Veneble LLP; Eric J. Franklin (57) ABSTRACT

A method for fine tuning of a robot program for a robot application comprising an industrial robot, a tool and a work object to be processed by the tool along a path comprising a number of desired poses on the work object, the robot program comprises a number of program instructions containing programmed poses corresponding to the desired poses, wherein the method comprises: defining a fine tuning coordinate system Xft, Yft, Zft, selecting one of said programmed poses pi, calculating said selected pose in the fine tuning coordinate system, producing program instructions for said selected pose in the fine tuning coordinate system, running said one or more program instructions by the robot, determining the difference between the pose obtained after running the program instructions and the desired pose, adjusting the fine tuning coordinate system in dependence of said difference, producing program instructions for said selected pose in the adjusted fine tuning coordinate system Xft', Yft', Zft'.

20 Claims, 8 Drawing Sheets

METHOD FOR FINE TUNING OF A ROBOT PROGRAM

FIELD OF THE INVENTION

The present invention relates to a method for fine tuning of a robot program for a robot application comprising an industrial robot, a tool and a work object to be processed by the tool along a path comprising a number of desired poses on the work object, the robot program comprises a number of program instructions containing programmed poses corresponding to the desired poses. The method according to the invention is useful for fine tuning robot programs being programmed off-line as well as online.

The invention is particularly useful in robot application that demands high accuracy, such as different types of machining applications, for example fettling, debarring, milling, sawing, grinding and drilling. The application is also useful in applications such as arc welding, water jet cutting, laser cutting, gluing and assembly.

PRIOR ART

A robot program comprises a number of program instructions controlling the movements of the robot. The robot program is based on a number of programmed poses, defining the relation between the tool and the object. A pose is defined by both a position and an orientation. A programmed pose comprises the position and orientation that a tool is expected to obtain in relation to a work object when running the robot program. Generation of a robot program comprises a first step wherein the poses of the path are defined and a next step wherein program instructions are generated based on the defined poses.

A robot application is an application in which an industrial robot is used for performing a work. Robots are often used in applications involving processing of the surface of a work object. Existing practice for programming a robot involves on-line teaching the robot a sequence of poses. The poses define a robot path, which the robot shall follow during processing of the object. The robot is taught how to perform a task by leading the tool through the various positions and orientations along the desired path during the programming. The robot program is then generated, based on the programmed poses. However programming a robot by teaching can be time-consuming, especially if the work object has a complex geometry.

The accuracy of an application is limited mainly by the repeatability of the robot mechanics and the accuracy with which it is possible to move and rotate the tool to the desired position and orientation. In many high accuracy applications like machining, laser cutting, laser welding etc. the robot repeatability is good enough but it is very difficult for a human eye to find the correct position and orientation of the tool. Moreover, even if a robot programmer with long programming experience manages to obtain the accuracy needed, it will take a lot of time.

The utilization of high-level computer programming language and CAD/CAM has made off-line robot programming more feasible for more complex applications. An industrial robot has to be used with regards to the components of the robot workcell, such as the coordinate frames and the errors introduced by the components. The work object and tool coordinate systems have to be known with high accuracy relative to the robot coordinate system. Thus, calibration has been the key to use robot off-line programming. However, when the robot runs the off-line generated program after the calibration, there will still remain errors due to errors in the robot kinematic and error in the calibration of the object and tool coordinate system. Therefore, the calibration methods used today for calibrating the coordinate systems, does not provide high enough accuracy for applications having very high accuracy requirements.

OBJECTS AND SUMMARY OF THE INVENTION

The object of the present invention is to provide a method for fine tuning a robot program, which method increases the accuracy of the application.

This object is achieved by a method for fine tuning of a robot program for a robot application, wherein the method comprises: defining a fine tuning coordinate system, selecting one of said programmed poses, calculating said selected pose in the fine tuning coordinate system, producing one or more program instructions for said selected pose in the fine tuning coordinate system, running said one or more program instructions by the robot, determining the difference between the pose obtained after running said one or more program instructions and the desired pose, adjusting the fine tuning coordinate system in dependence of said difference, so that the obtained pose approaches the desired pose, producing one or more program instructions for said selected pose in the adjusted fine tuning coordinate system, and repeating the method for at least one more of the programmed poses.

Thereby, a new adjusted robot program is obtained, which provides a higher accuracy of the result of the processing of the work object. The same local fine tuning coordinate system could be used for reprogramming other programmed poses in the vicinity of said pose, or each pose on the path could be provided with its own local fine tuning coordinate system. By reprogramming a pose means that one or more new robot program instructions are generated for the pose and the previous program instructions are substituted by the new program instructions. The method according to the invention is applied after calibration and programming of the application. By this method a high accuracy could be obtained in each pose along the path.

The fine tuning coordinate system must be known relative to a coordinate system defined in relation to the robot. Normally, a robot coordinate system attached to the base of the robot is used as a reference coordinate system for the robot. Preferably, the fine tuning coordinate system is a coordinate system defined in a fixed relation to an object coordinate system defined in a fixed relation to the work object. The object coordinate system is usually already defined in relation to the robot coordinate system. A robot program instruction defines the programmed pose for a robot movement, the object coordinate system that the programmed pose is related to and the tool coordinate system defined on the robot. To be able to adjust the programmed target pose in relation to the object coordinate system, the fine tuning coordinate system is defined in relation to the object coordinate system and the target pose is defined relative the fine tuning coordinate system.

Another way of tuning the target pose is to define a fine tuning coordinate system in relation to the tool coordinate system and to use the fine tuning coordinate system as the tool coordinate system when the robot motion is calculated for a specific programmed pose.

In the case that a fine tuning coordinate system is needed for each target pose, the fine tuning coordinate system can be defined as a path coordinate system which changes its pose all the way along the path. It could also be possible in this case to use the position and orientation of the programmed pose itself, i. e. the fine tuning coordinate system is defined as a coordinate system having the same orientation and position as the selected pose. In the detailed description of the invention, the case when the fine tuning coordinate system is defined in relation to the object coordinate system is describes for simplicity.

According to an embodiment of the invention, the fine tuning is repeated for a following pose on the path, and comprises: calculating said following programmed pose in the local fine tuning coordinate system of the previous pose, running the robot program to said following programmed pose in the local fine tuning coordinate system of the previous pose, measuring the difference between the obtained following pose and the desired following pose, adjusting a copy of the local fine tuning coordinate system of the previous pose so that the following obtained pose approaches the desired pose, and saving the adjusted copy of the local fine tuning coordinate system as a local fine tuning coordinate system for said following pose. Thus, the local fine tuning coordinate system for the previous pose is used for determining a local fine tuning coordinate system for the following pose on the path. The advantage with this is that the less data is needed to define the fine tuning if poses close to each other share a fine tuning coordinate system with the same adjustment.

According to an embodiment of the invention the difference between the pose obtained and the desired pose, is measured by moving the robot from the obtained pose to the desired pose and recording the change in robot pose during said moving of the robot. Thus, the robot is used for measuring the difference between the pose obtained and the desired pose. The advantage of using the robot for the measurements is that no special measurement unit is needed.

According to an embodiment of the invention the obtained pose of the tool and the desired pose of the tool on the work object, are measured by means of a positioning measuring unit and the difference between the obtained and desired pose are calculated as the difference between the measurements from said measuring unit. Advantages with using a positioning measuring unit for the measurements are that the positioning measuring unit is easier and safer to use and provides higher accuracy of the measurements than measuring with the robot.

According to an embodiment of the invention the method comprises: adding an offset distance to the programmed pose, running the robot program to said programmed pose with the offset distance added and removing the offset distance before reprogramming the pose. To make it easier to measure on the work object and the tool, an offset distance is added to the poses on the programmed path. For example, if the tool is used to mill, grind or drill internal structures on the work object, an offset distance has to be added to the path positions to make it possible to perform the measurements. Preferably, said offset distance corresponds to a distance big enough to be able to measure between the tool and the work object with the positioning measuring unit.

According to an embodiment of the invention the method further comprises checking if there is a substantial difference between the obtained pose and the desired pose, when the programmed pose is defined in a fine tuning coordinate system adjusted for a previous pose, and if there is a substantial difference between the obtained and desired pose, the fine tuning coordinate system is adjusted based on said measured difference, so that the obtained pose approaches the desired pose, and the adjusted fine tuning coordinate system is saved as a local fine tuning coordinate system for the pose, and if there is not a substantial difference between the obtained and desired pose, the fine tuning coordinate system which was used for calculating the programmed poses is saved as the local fine tuning coordinate system. According to this embodiment an adjustment of the fine tuning coordinate system is only done if there is a significant difference between the desired pose and the obtained pose, otherwise no adjustment is made. Thus, if there are only small differences between the desired and the obtained poses, the same local fine tuning coordinate system adjusted for a previous pose is used for the poses.

Even if the tool is positioned accurately to the desired poses by the fine tuning method according to the previous embodiments, there may still be errors after processing the work object with the robot. That depends on the fact that the robot is not rigid, but compliant to the tool forces. According to an embodiment of the invention, the method further comprises procedures to compensate for the compliance of the robot comprising: measuring at least one pose along said path on a reference work object having a desired geometry, running the robot program for said application, whereby the tool processes a real work object, measuring at least one corresponding pose along said path on the processed real work object, calculating the difference between the measured pose on the reference work object and the corresponding measured pose on the processed work object, adjusting the local fine tuning coordinate system of the pose, in dependence of said calculated difference between the measured poses on the reference work object and on the processed work object, so that the pose on the processed work object approaches the pose on the reference work object, saving the adjusted local fine tuning coordinate system for the pose, and reprogramming the pose, based on the adjusted local fine tuning coordinate system for the pose. As the fine tuning method comprises an additional adjusting of the fine tuning coordinate systems and reprogramming of the poses on the path, the accuracy of the robot application is further improved. Preferably, a plurality of path poses on the reference work object and corresponding path poses on the processed work object are measured, and the fine tuning coordinate systems for the path poses will undergo an additional adjusting according to this embodiment of the invention.

Another object of the invention is to provide a computer program product for fine tuning an off-line programmed robot program comprising a number of programmed poses, defining the relation between a tool and a work object, to achieve an increased accuracy of the processing result on the work object. This object is achieved by a computer program product according to the corresponding appending claim, which when run on a computer execute the method according to the invention. The computer program product can be provided via any computer readable medium or via a network, such as the Internet.

It is easy to realize that the method according to the invention, as defined in the appending set of method claims, is suitable for being executed by a computer program having instructions corresponding to the steps in the inventive method when run on a processor unit. Even though not explicitly expressed in the claims, the invention covers a computer program product in combination with the method according to the appended method claims.

Another object of the invention is to provide a computer readable medium having a program recorded thereon for fine tuning of a robot program, where the program is to make a computer perform the steps of the aforementioned computer program product, when said program is run on the computer.

The computer program product may be run on a controller of the robot or on any other computer comprising a processor and suitable memory.

BRIEF DESCRIPTION OF THE DRAWINGS

The invention will now be explained more closely by the description of different embodiments of the invention and with reference to the appended figures.

FIGS. 2b-c show cross sectional views along the line A—A in FIG. 2a.

DETAILED DESCRIPTION OF PREFERRED EMBODIMENTS OF THE INVENTION

The robot application selected to describe the method according to the invention is machining, but the method can as well be used for any type of application, where high accuracy is needed.

Figure 1:
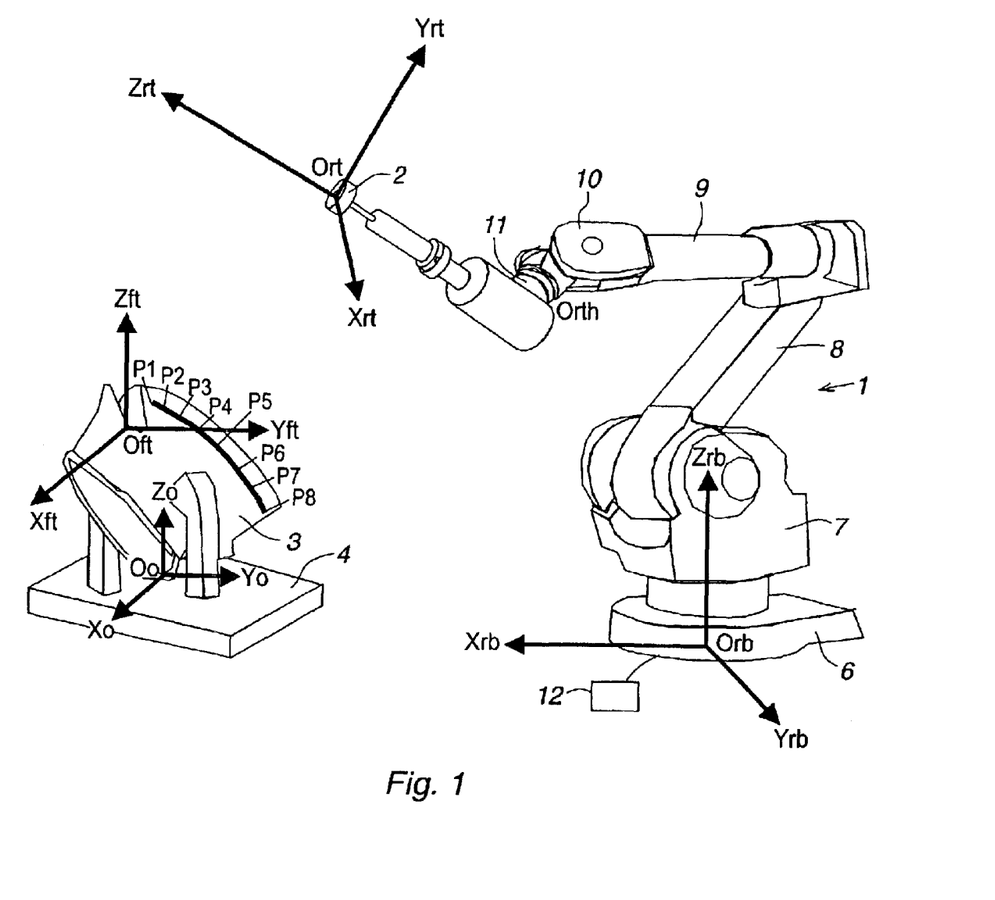
FIG. 1 shows an industrial robot application and the coordinate systems defined in the application.

FIG. 1 shows a robot application comprising an industrial robot 1, a tool 2 mounted on the robot, and a work object 3 to be processed by the tool. The work object 3 is attached to a fixture 4. The robot 1 comprises a base 6, which is firmly mounted on a foundation. The robot further comprises a support 7, which is rotateable relative to the base 6 around a first vertical axis. In the upper end of the support 7, a first robot arm 8 is rotatably mounted around a second horizontal axis. In the outer end of the first arm, a second arm 9 is rotatably mounted relative to the first arm around a third axis. The second robot arm 9 is rotatably mounted relative to an inner part of the arm around a fourth axis, coinciding with the length axis of the second arm 9. The second arm 9 supports in its outer end a so-called robot hand 10, which is rotateable around a fifth axis, which is perpendicular to the length axis of the second arm 9. The robot also comprises a tool holder 11. The outer part of the robot hand and thus the tool holder 11 is rotateable relative to the inner part of the robot hand around a sixth axis.

The robot further comprises a controller 12 for controlling the movements of the robot. The controller comprises at least one processor for executing the robot program instructions and memory for storing the robot program.

Of central importance for the method according to the invention are the different coordinate systems that are used in the fine tuing of the robot application. The placement of the robot itself is usually described by a robot base coordinate system with origin Orb, and axes Xrb, Yrb, and Zrb. The robot base coordinate system is located in the base 6 of the robot. Further, a robot tool coordinate system Ort, Xrt, Zrt, Yrt is defined in the tool center point (TCP) of the tool 2. An object coordinate system, with origin Oo and axes Xo, Yo, Zo is defined on the object. The relations between the tool coordinate system, the object coordinate system and the robot base coordinate system are known through calibration of the coordinate systems.

The task for the robot is to move the tool 2 along a path with defined poses P1–P8. A pose defines the position and orientation that the tool coordinate system must obtain during program execution. Thus, each programmed pose defines the pose of the tool coordinate system Ort in the object coordinate system Oo. However, when running the robot program, the obtained poses of the tool will deviate to some extent from the desired poses P1–P8.

The purpose of the invention is to fine tune an off-line generated robot program in such a way that the tool poses obtained when the robot program is run, get as close as possible to the desired tool poses P1–P8 on the work object. For this purpose a reference object with the desired geometry is provided. It is then possible to measure the difference between the obtained tool poses and the desired tool poses on the reference work object. For example, the reference object is a work object milled with high precision in a CNC machine. A position measuring unit, such as a digitizer or the robot itself are used for the measurements.

To make this fine tuning, a fine tuning coordinate system with origin Oft, and axes Xft, Yft, and Zft is introduced. The relation between the fine tuning coordinate system Ort and the object coordinate system is determined. Since the object coordinate system is known in relation to the robot base coordinate system, the fine tuning coordinate system will be known in relation to the robot base coordinate system and the robot can use this coordinate system when defining the programmed poses in the robot program. In this embodiment the fine tuning coordinate system is different from the object coordinate system, but it is also possible to use the object coordinate system as the fine tuning coordinate system. In another embodiment it is also possible to use the fine tuning coordinate system as a local tool coordinate system.

A number of the programmed poses on the path are selected for the fine tuning. Either could all of the programmed poses be selected, or only some of the poses. The distance between the selected poses should be such that the necessary accuracy of the fine tuning is obtained. In the embodiment described herein all the programmed poses P1–P8 are selected for the fine tuning. The selected programmed poses P1–P8 are calculated in locally adjusted fine tuning coordinate systems Oft.

Figure 2A:
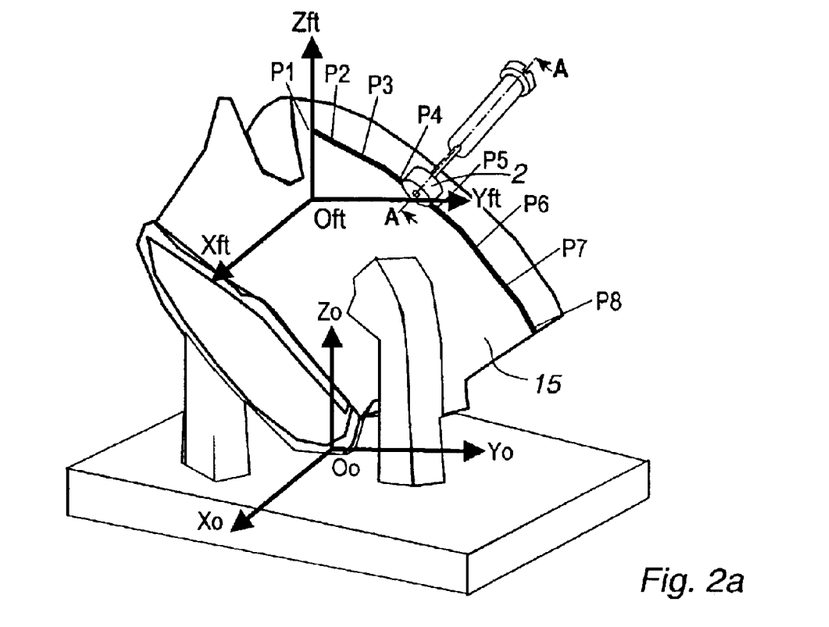
FIGS. 2a-c show the difference between a desired pose and the pose obtained after execution of a program instruction.
Figure 2B:
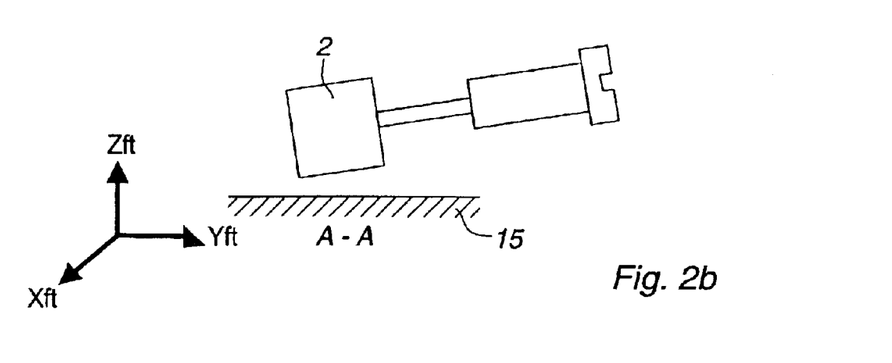
Figure 2C:
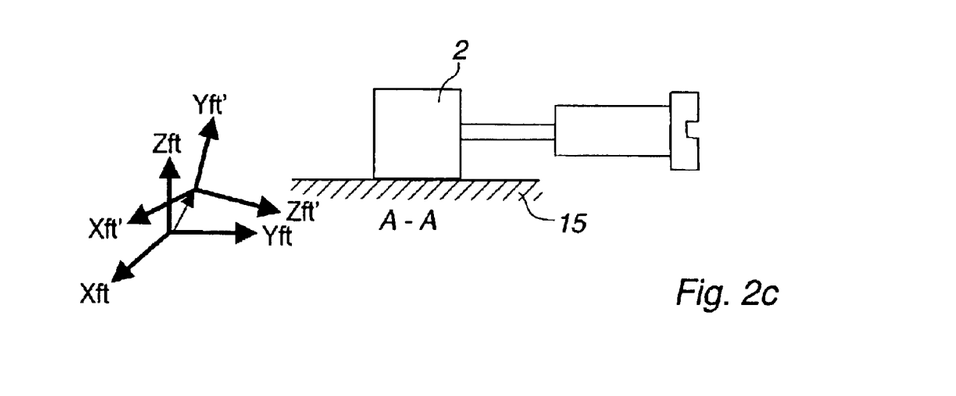

FIGS. 2a-c illustrates the fine tuning according to one embodiment of the invention. A reference object 15 is used for measuring the difference between an obtained and a desired pose. A fine tuning coordinate system Oft is defined in relation to the object coordinate system Oo. There is a robot program comprising instructions for the programmed poses P1–P8 on the work object. The programmed pose P1 is calculated in the fine tuning coordinate system Oft. Thereafter, the robot program instruction for programmed pose P1, calculated in the fine tuning coordinate system, is executed by the robot. FIGS. 2a and 2b show the tool pose obtained after execution of the program instruction. As shown in FIG. 2b there is a difference between the obtained and the desired pose, since the tool 2 is tilted and has a distance to the reference object 15.

FIG. 2c shows the desired pose of the tool 2 in relation to the object 15. The difference between the desired and the obtained pose is determined. This difference can be compensated by a small offset in position and a small rotation of the fine tuning coordinate system Oft. In FIG. 2c it is shown how the desired pose of the tool 2 is achieved by adjusting the fine tuning coordinate system Oft into a new fine tuning coordinate system Oft'. The fine tuning coordinate system Oft is thus adjusted in dependence of the determined difference between the obtained and the desired pose so that the obtained pose approaches the desired pose. The adjusted fine tuning coordinate system Oft' is saved as a local fine tuning coordinate system for pose P1. In each of the following poses P2–P8 the difference between the obtained tool pose and the desired tool pose in relation to the reference object is measured. This difference is compensated by adjusting the fine tuning coordinate system of the previous pose, so that the obtained pose approaches the desired pose. The adjusted fine tuning coordinate system are saved as local coordinate systems for the poses.

Thus, in order to compensate for the measured error a local fine tuning coordinate system is defined for the actual pose and the position and orientation of this local fine tuning coordinate system is changed to compensate for the determined tool pose difference. When the robot tool is moved from one programmed pose to the next, the local fine tuning coordinate system for the previous pose is used in the robot program. This means that if the tool pose error is the same in two consecutive poses, then they will share the same local fine tuning coordinate system in the robot program. In the worst case, the fine tuning will give rise to a fine tuning coordinate system for each pose of the program, but usually one fine tuning coordinate system can be shared between several programmed poses.

The tool pose difference is for example measured by manipulating the tool with the robot until the tool reaches the desired pose in relation to the work object, i. e. the pose shown in FIG. 2c. The robot is moved from the obtained pose to the desired pose and the change in robot pose during said moving of the robot is recorded. This can be performed with the naked eye, but the accuracy will then sometimes not be good enough and there is a safety problem if the operator needs to be very close to the tool to see and minimize the tool pose error. Instead a measuring unit, such as a 3D digitizer can be used. With such a measuring unit it is possible to measure position and even orientation, depending on the number of degrees of freedom of the measuring unit and the probe type used. The digitizer can be mechanical or optical and if lower accuracy can be accepted also 3D measurement systems based on ultrasonics, magnetic fields and microwaves (GPS) can be used.

Figure 3:
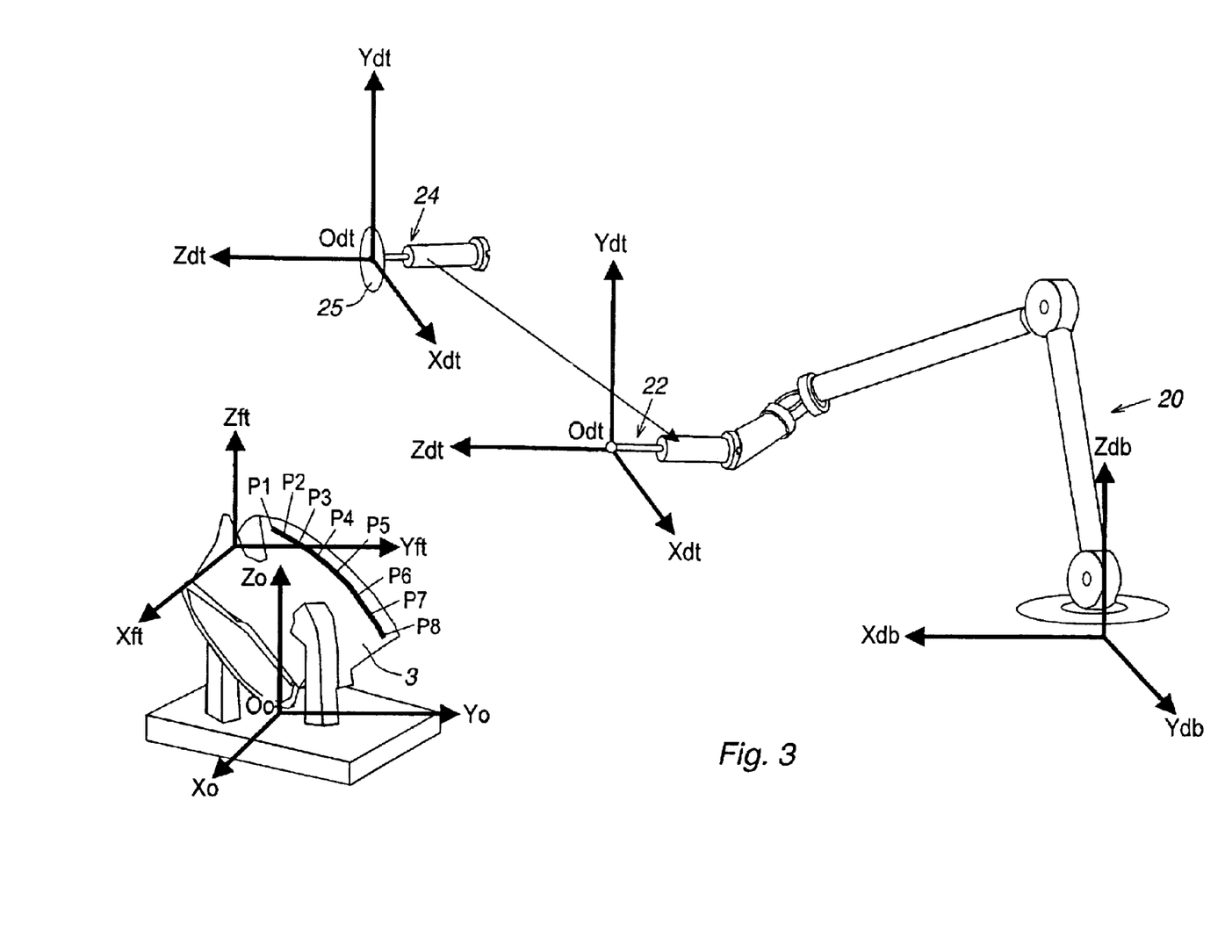
FIG. 3 shows a digitizer and its coordinate systems.

In FIG. 3 a digitizer 20 with 6 degreases of freedom is shown, having a digitizer base coordinate system dB with an origin Odb, and axes Xdb, Ydb, Zdb, and a digitizer tool coordinate system dt with origin Odt, and axes Xdt, Ydt, Zdt. The tool in the figure is a measurement probe 22 for position measurements, but a probe 24 with a fixed plate 25 as also illustrated in the figure can be used to measure both position and tilting angles, to be used for example when programming a milling plane. It is also possible to put the real robot tool on the digitizer and use the digitizer to program the robot path and to calibrate the object coordinate system and the tool coordinate system of the robot. However, in this case the digitizer is used to make the measurements for the fine tuning of the tool poses in a robot program.

Figure 4:
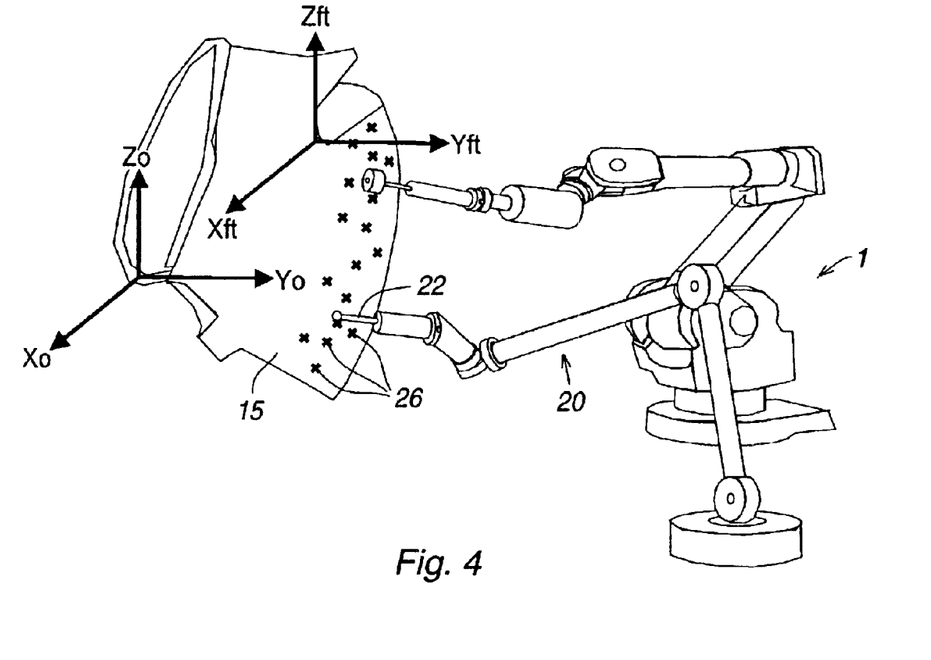
FIGS. 4 and 5 illustrate how the measurements necessary for the fine tuning is performed according to an embodiment of the invention.
Figure 5:
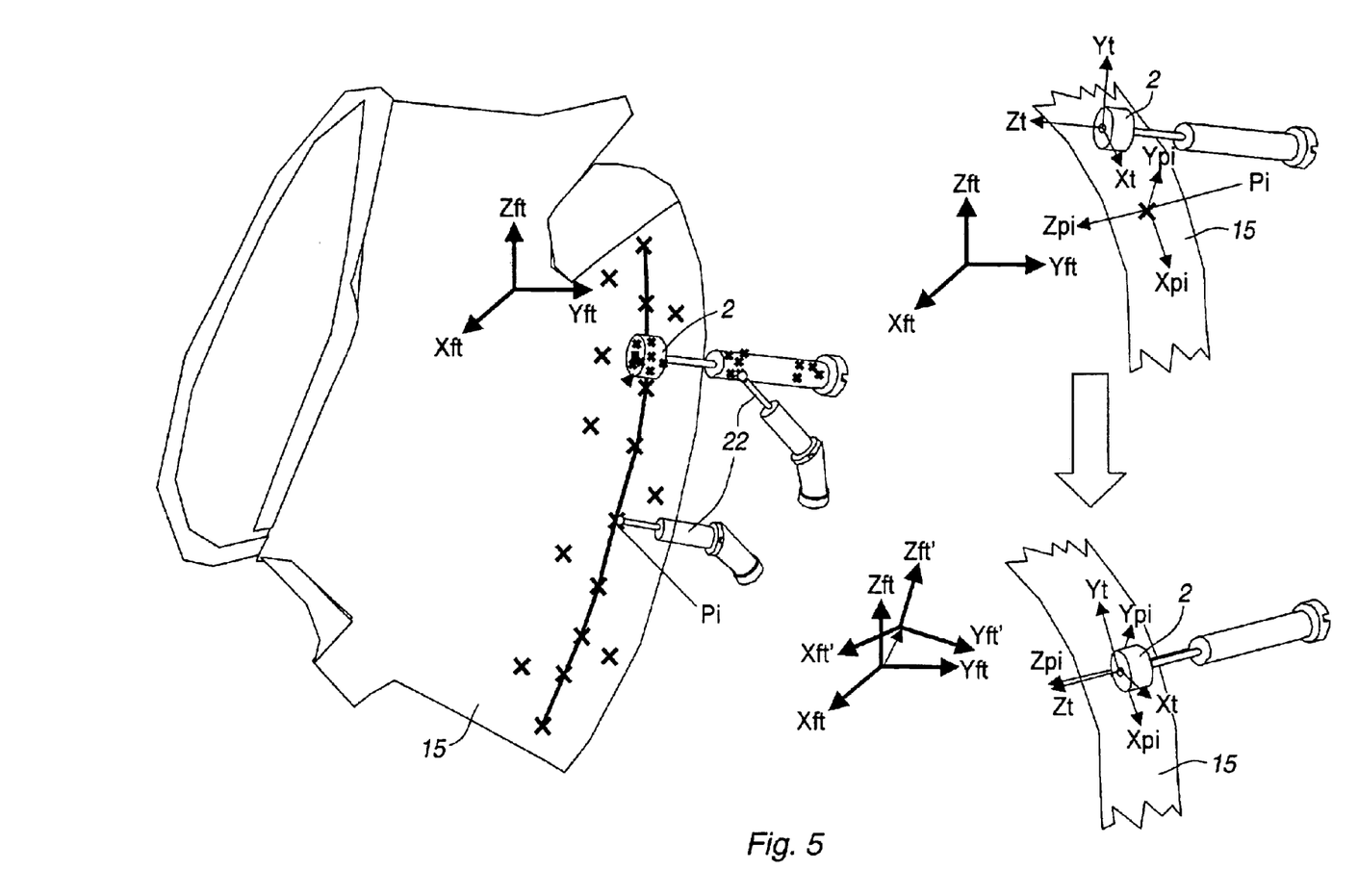

How the measurements with a measuring unit such as a digitizer are made, according to an embodiment of the invention, will now be described with reference to FIGS. 4 and 5, for the case of milling a curved shape surface on a work object. The robot is programmed to mill the surface with a milling tool 2 according to FIG. 4. To obtain a high precision of the milling, both the position and the orientation of the milling tool 2 must be very accurate in relation to the work object to be milled. The method to obtain this accuracy is described in the following. A robot program containing several tool poses is programmed by means of the robot or a digitizer. The programmed poses are defined in the fine tuning coordinate system. A reference work object 15 that has already been milled with high precision, is arranged in the vicinity of the robot 1 and the digitizer 20. The digitizer 15 is used for measuring on several locations 26 on the milled surface of the references object 15 to obtain position and orientation of the surface, and thus the desired pose Pi to be programmed. In FIGS. 4 and 5 a point measurements probe 22 is used, and then at least 3 points must be measured to obtain the orientation (normal vector direction) of the surface. If a disc probe is used instead, only one measurement is necessary to obtain the surface orientation (surface normal). All the measurements are provided in the digitizer base coordinate system.

The robot carries either the real tool 2, as shown in figures, or a reference tool having well defined surfaces for the measurements. The robot program is run until the first pose P1 of the robot path is reached. When the program is run, the robot moves according to the program instructions and the tool obtains the programmed pose. As the tool 2 has reached the programmed pose, the surfaces on the tool, or on a reference structure mounted on the tool, is measured with the digitizer, as shown in FIG. 5. The reference structure is, for example, a plane, a sphere, a cylinder defining, a cone, or a cube. Knowing the geometry relations between the measured surfaces and the tool coordinate system, best fit calculations between the measurement and a geometric model of the tool surfaces, is done to obtain the tool coordinate system Xt, Yt, Zt in the digitizer base coordinate system.

The best fit between the measurements and the geometric model of the tool surfaces is, for example, made by minimizing the distance between the measurements and a surface of the model, by means of a least mean square method, through translation and rotation of the geometric model. Alternatively, other optimization algorithms, for example, Gauss Newton, could replace the least mean square method. The geometric model could be given by a CAD model of the object, either in an analytic form or in an approximate form by, for example, polygon or spline functions. In the case of a cube, the mathematical model is the equations of the planes of the cube.

The difference between the position and orientation of the measured tool coordinate system Xt, Yt, Zt and the coordinate system Xpi, Ypi, Zpi of the measured pose Pi on the surface of the reference structure, is calculated. The position of a pose Pi is measured by the digitizer directly on the reference object surface and the orientation information for the pose Pi is obtained by measuring at least 2 more positions on the work object surface close to the desired position of Pi. If a probe 25 as shown in FIG. 3 is used, the orientation will directly be achieved from the digitizer when the plate 25 is pressed against the reference work object surface. Thereafter a corresponding adjusting of the fine tuning coordinate system Xft, Yft, Zft is made so that an adjusted fine tuning coordinate system Xft', Yft', Zft' is obtained.

The adjusted fine tuning coordinate system is store as a local fine tuning coordinate system for the pose. The pose in the robot program instruction is reprogrammed to be based on the new locally adjusted fine tuning coordinate system. The new local fine tuning coordinate system is also used when the next robot movement instruction to the next pose in the path is executed. The above described measuring is repeated for the next pose. If now the difference between the desired and the obtained poses is small, the local fine tuning coordinate system of the previous pose is used for the pose, otherwise a new adjusted fine tuning coordinate system is calculated and saved as a local fine tuning coordinate system for the pose, and used for reprogramming the pose. This fine tuning algorithm is repeated for all programmed poses until the end of the path.

The result of the fine tuning is shown in the small figures to the right in FIG. 5. The desired position and orientation of the tool coordinate system is depicted by the coordinate system Xpi, Ypi, Zpi and the obtained pose of the coordinate system when running the robot program is given by Xt, Yt, Zt. By the measurements of the difference between the obtained and desired tool pose and moving and rotating the fine tuning coordinate system to compensate for the pose error, the tool will get closer to the desired position and orientation.

Figure 6:
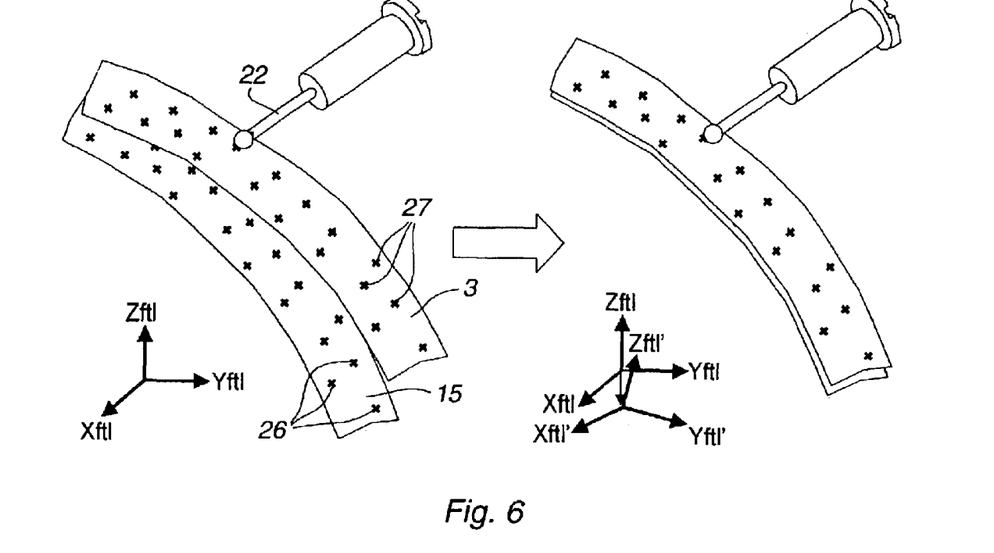
FIG. 6 shows further adjustment of the fine tuning coordinate system according to an embodiment of the invention.

Even if the tool is positioned accurately to the desired poses by the fine tuning method above, there may still be errors after making the milling with the robot. This depends on the fact that the robot is not rigid but compliant to the tool forces. To compensate for this a method is used which will be described with reference to FIG. 6. It is a pre requisite that the digitizer has been used to measure the milling surface in several points 26 on a reference object 15 according to FIGS. 4 and 5 and that the base coordinate system of the digitizer is not moved. Now a real unprepared work object 3 is mounted on its fixture 4 and the robot 1 makes the milling with the robot program fine tuned according to the method described above. After the milling the digitizer is used to measure a plurality of points 27 on the milled surface of the real object 3. The difference in position and orientation between the milled surface of the real object 3 and the surface of the reference object 15 is calculated for each programmed pose. The local fine tuning coordinate system Xftl, Yftl, Zftl is adjusted to compensate for the calculated difference. The adjusted local fine tuning coordinate system is saved as a new local fine tuning coordinate system Xftl', Yftl', Zftl'. If two poses have the same local fine tuning coordinate system, a new local fine tuning coordinate system is calculated for one of the two poses if necessary.

The robot program is now run on a new work object, using the new local fine tuning coordinate systems in the robot program. The above described measuring and calculations are repeated iteratively, and if the differences now are small enough for the application the previously stored local fine tuning coordinate systems are used for reprogramming the path, otherwise new adjusted local fine tuning coordinate systems are calculated to improve the compensation.

Figure 7:
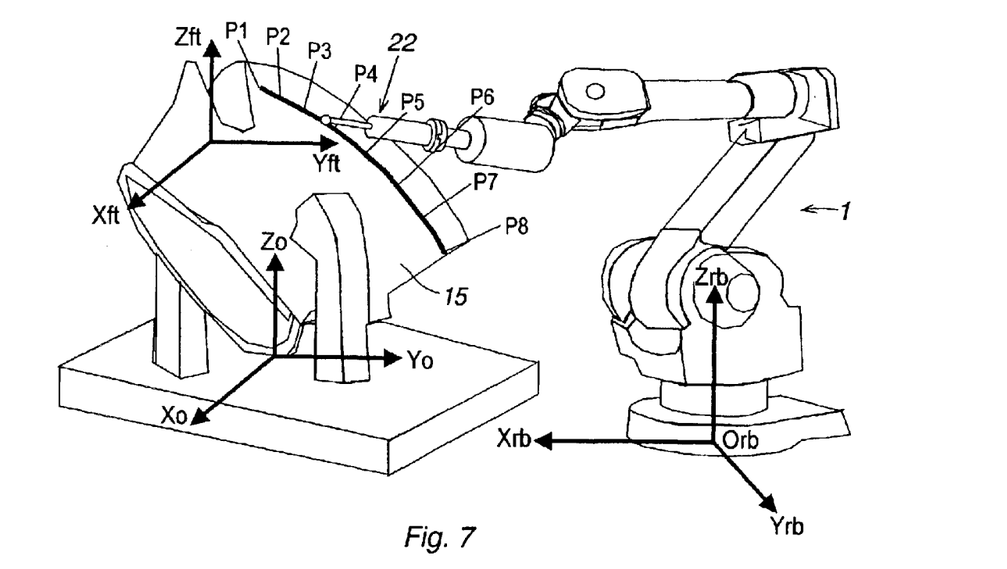
FIG. 7 shows how the robot can be used for performing measurements.

FIG. 7 shows that the robot 1 itself can be used for the measurements on at first the reference work object and then the work object that has been milled by the robot. The advantage of using the robot for the measurements is that it can be made automatically. The measurement probe 22 is handled as a tool, for example mounted and dismounted on the robot automatically by means of a tool exchanger.

Figure 8:
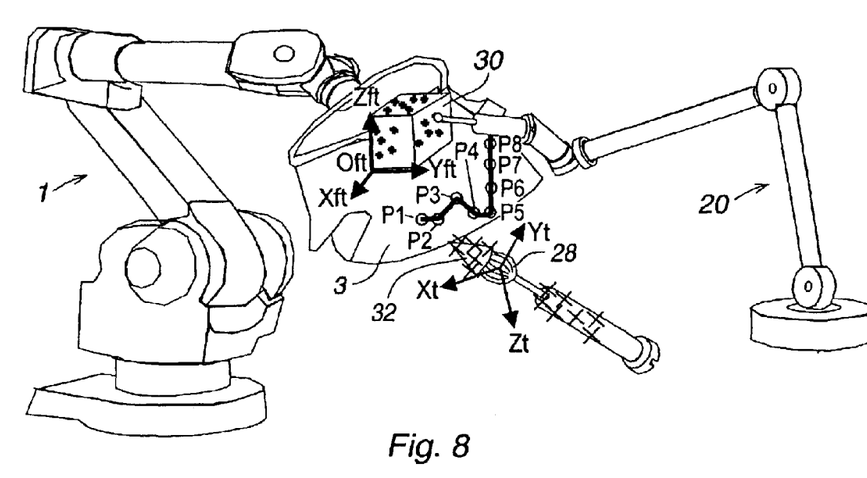
FIG. 8 shows the fine tuning when the work object is manipulated by the robot and the tool is fixed in the room.

FIG. 8 shows the fine tuning when the work object 3 is manipulated by the robot and a tool 28 is fixedly mounted in the robot cell. Since it is now the fine tuning coordinate system Xft, Yft, Zft that moves and the tool coordinate system that is fixed, the method will be somewhat modified. A reference work object 15 is mounted on the robot. Reference surfaces are defined on, or in a fixed relation to the work object. Either suitable reference surfaces are found on the object itself, or a reference structure, having well defined surfaces, is mounted on the work object. In this embodiment a cubic reference structure 32 is mounted on the work object.

Figure 9:
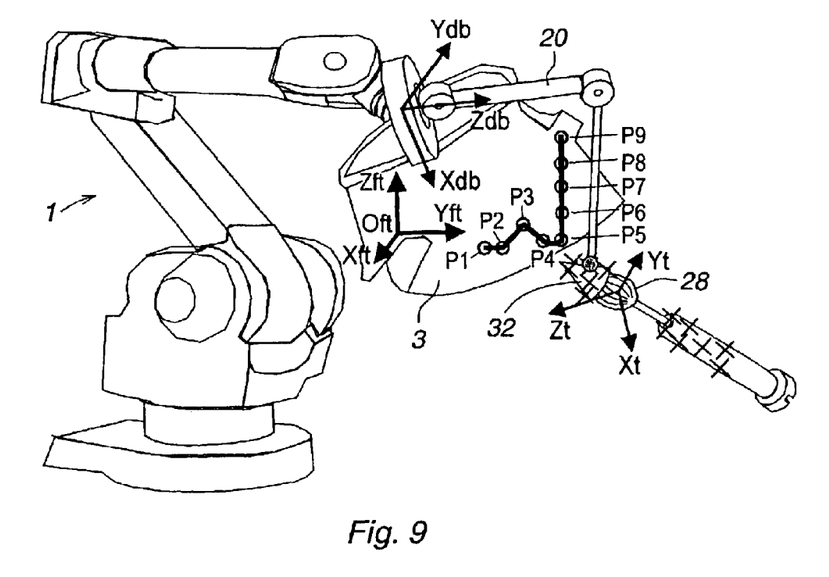
FIG. 9 shows measurements made by a digitizer mounted on the work object.

The position and orientation of the tool coordinate system Xt, Yt, Zt are measured by means of the digitizer 20, for example by measurements on reference surfaces on the tool 28, or on surfaces on a reference structure mounted on the tool, or on reference surfaces on a reference tool. The measurements are used for best fit to a geometric model of the reference surfaces or the reference structures. Then, knowing the relation between the geometry of the reference structure and the tool coordinate system, the position and orientation of the tool coordinate system can be calculated in the digitizer base coordinate system. In FIG. 9 a cone shaped reference structure 32 is mounted on the tool to obtain the tool coordinate system by best fit between the cone geometric model and the measured points on the cone surface.

The path poses P1–P8 are programmed with the digitizer. Thus, the digitizer measures the desired poses on the work object during the programming. A fine tuning coordinate system Xft, Yft, Zft is defined in relation to a geometric model of surfaces of the work object or of the reference structure 30. The programmed poses are calculated in relation to the defined fine tuning coordinate system. The robot program is run to the first pose of the path, and accordingly the work object is moved to the first pose P1. The position of the work object is determined in relation to the digitizer by measuring a number of points on the reference surfaces or on the reference structure 30 on the work object and making a best fit to a corresponding geometric model of the reference surfaces or the reference structure 30. The digitizer makes the measurements. Since the relation between the path poses and the reference structure is known, it is possible to calculate the obtained programmed pose. If the calculated programmed pose deviates from the pose programmed with the digitizer, the fine tuning coordinate system is adjusted to reduce the deviation. The adjusted fine tuning coordinate system is saved as a local fine tuning coordinate system for the pose.

Thereafter, the robot is run to the next programmed pose and the pose is measured in relation to the fine tuning coordinate system. Calculate the pose in the local fine tuning coordinate system of the previous pose and if this pose deviates too much from the pose defined by the digitizer, then a new fine tuning coordinate system is defined for the pose, and the error is compensated by adjusting the new fine tuning coordinate system. The adjusted fine coordinate system is saved as a local coordinate system for the pose. If the pose deviation is small, the same fine tuning coordinate system is used for this pose as for the previous pose. The proceeding is repeated until the programmed path has come to an end.

FIG. 9 shows that if the digitizer is mounted on the object, the measurements will be the same as for FIG. 5. When the robot moves the work object 3, the base coordinate system Xdb, Ydb, Zdb of the digitizer will follow this movement and the path poses P1–P8 on the object will be the same all the time in relation to the digitizer base coordinate system. Instead the tool coordinate system Xt, Yt, Zt will move relative to the digitizer base coordinate system. For each pose in the robot program, the digitizer measures the tool coordinate system and since the desired poses on the object have been measured by the digitizer during the programming, it will be possible to measure the difference between the obtained pose of the tool when the robot runs the program and the desired pose on the work object.

In FIG. 9 the reference structure 32 is mounted on the tool to obtain the tool coordinate system by best fit of measured points on the cone surface and the cone geometric model. Then, by knowing the relation between the cone and the tool coordinate system, the tool coordinate system can be calculated in the digitizer base coordinate system. Notice that in the figure a digitizer with only 3 degrees of freedom has been used. Of course also a digitizer with 6 degrees of freedom can be used in this case. One problem in this case will be that there might be a collision between the reference structure on the tool and the object. Therefore the fine tuning robot program should be generated with an offset out from the work object surface. Later, when the fine tuning is finished this offset is taken away.

When the robot program has been fine tuned by means of the reference object, the reference object is replaced by a raw (not processed) work object and the fine tuned robot program is run. Then the digitizer can be used to measure the processed part of the work object and according to FIG. 6, a new correction of the path by means of adjusting the fine tuning coordinate systems can be made. In the application shown in FIG. 9, the orientation of the tool might not be important and then it is usually enough just to adjust the position of the fine tuning coordinate systems.

It should be mentioned that it could be possible to define several object coordinate systems and use these as fine tuning coordinate systems. However, there are usually several paths on an object and then it will be difficult to have object coordinate systems handling both the global geometry of the object and the local pose adjustments of the different paths. In a later stage it will also be possible to recalculate the individual poses in the robot program by means of the fine tuning coordinate systems, making it possible to express the programmed poses after the fine adjustment in the object coordinate system for the work object.

It was mentioned earlier that an offset was added to the robot program poses to be able to run the program with a reference structure on the tool without colliding with the work object. This is even more important if the tool is used to mill, grind or drill internal structures on the work object. This is exemplified in Figure 10, where a milling wheel 35, having a radius R, is programmed to mill a cylindrical hole 36 in the work object.

Figure 10:
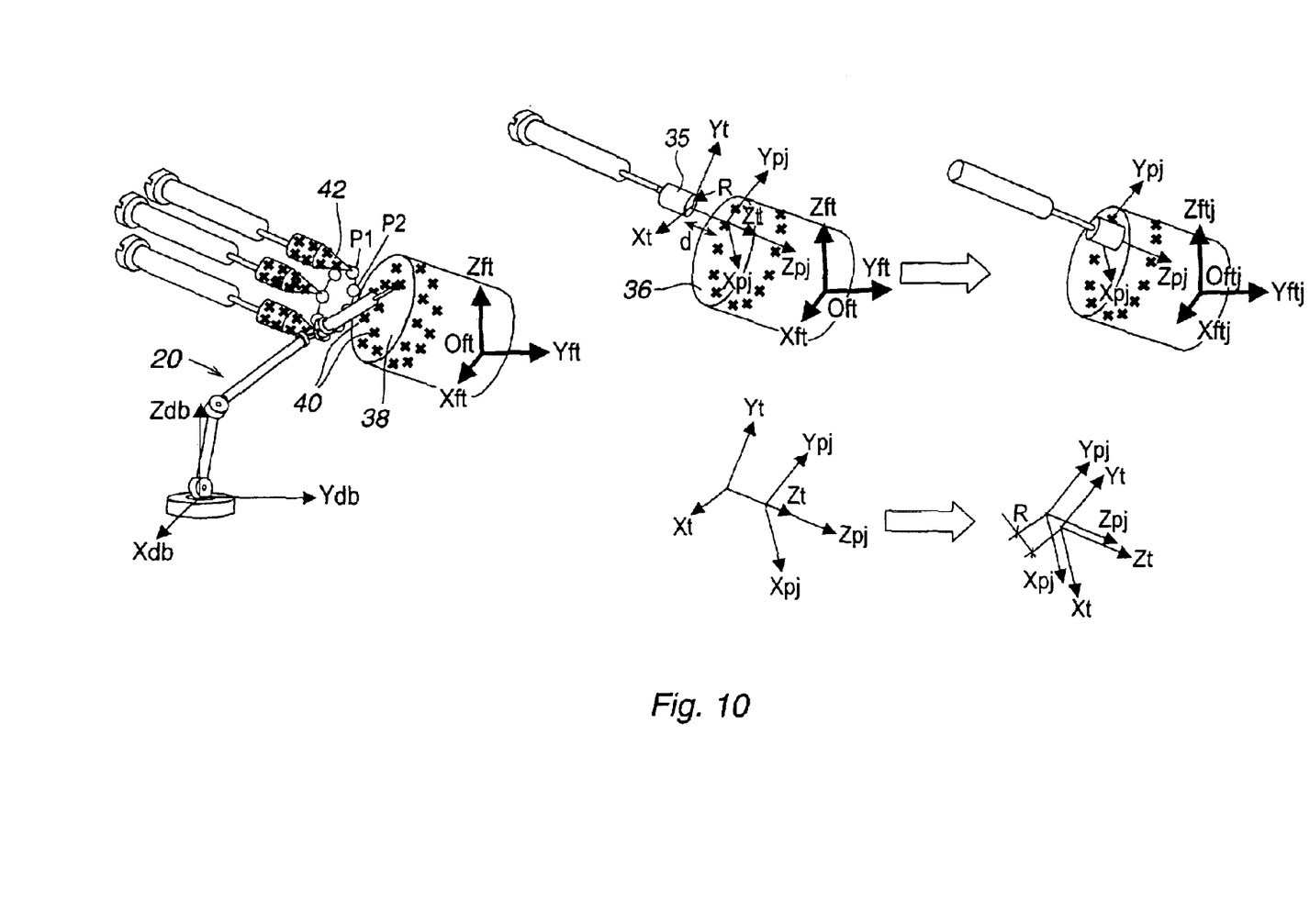
FIG. 10 shows measurements made by the digitizer when an offset is added to the robot program poses.

The procedure in this case will now be described with reference to FIG. 10. The tool poses are programmed by the digitizer 20 in an accurately machined hole 38 of a reference work object. The digitizer measures several points 40 on the cylindrical inner surface of the hole 38 to be able to define the orientation and position of the tool 35. From the digitizer measurements a robot program is generated with tool positions and orientations as defined by the digitizer. An offset d in the direction of the central axis of the cylinder is added to each programmed pose. The program with the offset is run by the robot with a reference tool, or the real tool with a reference structure 42 mounted on it, or with a reference structure defined by the tool geometry itself. For each or some of the poses pj in the robot program the robot is stopped and the digitizer is used to measure on the surfaces on the tool reference structure 42. From these measurements and the geometric model of the reference structure a best fit is made and the tool coordinate system Xt, Yt, Zt is calculated in the digitizer base coordinate system Xdb, Ydb, Zdb.

Now the difference between the desired tool coordinate system on the pose in the cylindrical hole after adding the offset and the measured tool coordinate system pose is calculated. If this difference is too big, a fine tuning coordinate system is calculated for the pose to compensate for the pose difference. As before, this fine tuning coordinate system Oft will be used when running the robot to the next pose of the program. If in the next pose of the program the measured difference is small, the same fine tuning coordinate system as in the previous programmed pose will also be used for this pose, otherwise a new fine tuning coordinate system will be defined to compensate for the pose error. The real program is then generated by taking away the offset values from the fine tuned program.

Preferably the robot runs the robot program with an offset perpendicular to the surface of the reference object. The offset should be as small as possible, but not smaller than it will be possible to measure the pose of the tool with the digitizer. If it is possible to dismount the work object after making the programming with the digitizer without moving the digitizer base, it will usually not be necessary to run the robot program with an offset during the fine tuning.

The present invention is not limited to the embodiments disclosed but may be varied and modified within the scope of the following claims. For example order of the steps in the method can be different from the order the steps described herein. For example, the fine tuning coordinate system is defined in relation to the robot base coordinate system, the tool coordinate system, the object coordinate system or any other coordinate system in the application.

What is claimed is:

1. A method for fine tuning of a robot program for a robot application comprising an industrial robot, a tool and a work object to be processed by the tool along a path comprising a number of desired poses on the work object, the robot program comprises a number of program instructions containing programmed poses corresponding to the desired poses, wherein the method comprises:

a) defining a fine tuning coordinate system, b) selecting one of said programmed poses, c) calculating said selected pose in the fine tuning coordinate system, d) producing one or more program instructions for said selected pose in the fine tuning coordinate system, e) running said one or more program instructions by the robot, f) determining the difference between the pose obtained after running said one or more program instructions and the desired pose, g) adjusting the fine tuning coordinate system in dependence of said difference, so that the obtained pose approaches the desired pose, h) producing one or more program instructions for said selected pose in the adjusted fine tuning coordinate system, and i) repeating the steps b–h for at least one more of the programmed poses.

2. A method according to claim 1, comprising saving the adjusted fine tuning coordinate system as a local fine tuning coordinate system for the pose, wherein the steps b–h are repeated for a following pose on the path, and comprises: calculating and producing one or more program instructions for said following programmed pose in the local fine tuning coordinate system of the previous pose, running the program instructions to said following programmed pose, determining the difference between the obtained following pose and the desired following pose, adjusting a copy of the local fine tuning coordinate system of the previous pose so that the following obtained pose approaches the desired pose, and saving the adjusted copy of the local fine tuning coordinate system as a local fine tuning coordinate system for said following pose.

3. A method according to claim 2, wherein it comprises checking whether there is a substantial difference between the obtained pose and the desired pose, and if there is a substantial difference between the obtained and desired pose, the fine tuning coordinate system is adjusted based on said measured difference, so that the obtained pose approaches the desired pose, and the adjusted fine tuning coordinate system is saved as a local fine tuning coordinate system for the pose, and if there is not a substantial difference between the obtained and desired pose, the fine tuning coordinate system which was used for calculating the programmed poses is saved as the local fine tuning coordinate system.

4. A method according to claim 1, wherein determining the difference between the pose obtained and the desired pose, comprises moving the robot from the obtained pose to the desired pose and recording the change in robot pose during said moving of the robot.

5. A method according to claim 1, wherein step f comprises measuring the obtained pose of the tool and the desired pose of the tool on the work object, by means of a positioning measuring unit and calculating the difference between the obtained and desired pose as the difference between measurements from said measuring unit.

6. A method according to claim 1, wherein the method comprises adding an offset distance to the programmed pose, running the program instructions to said selected pose with the offset distance added, and removing the offset distance before executing step i.

7. A method according to claim 1, wherein said offset distance corresponds to a distance big enough to be able to measure between the tool and the work object with the positioning measuring unit.

8. A method according to claim 1, wherein the fine tuning coordinate system is defined as an object coordinate system, defined in a fixed relation to the work object.

9. A method according to claim 1, wherein the fine tuning coordinate system is defined in relation to a tool coordinate system defined in a fixed relation to the tool, and the fine tuning coordinate system is used as a local tool coordinate system.

10. A method according to claim 1, wherein the fine tuning coordinate system is defined as a path coordinate system.

11. A method according to claim 1, wherein the fine tuning coordinate system is defined as a coordinate system having the same orientation and position as the selected pose.

12. A method according to claim 1, wherein the method further comprises:
    measuring at least one pose along said path on a reference work object having a desired geometry,
    running the robot program for said application, whereby the tool processes a real work object,
    measuring at least one corresponding pose along said path on the processed real work object,
    calculating the difference between the measured pose on the reference work object and the corresponding measured pose on the processed work object, and
    adjusting the local fine tuning coordinate system of the pose, in dependence of said calculated difference between the measured poses on the reference work object and on the processed work object, so that the pose on the processed work object approaches the corresponding pose on the reference work object,
    saving the adjusted local fine tuning coordinate system for the pose, and
    producing one or more new program instructions for the pose, based on the adjusted local fine tuning coordinate system for the pose.

13. A method according to claim 12, wherein the method comprises: measuring a plurality of poses along said path on the reference work object, measuring a plurality of corresponding poses along said path on the processed real work object, calculating the difference between the measured poses on the reference work object and the corresponding measured poses on the processed work object, and adjusting the local fine tuning coordinate system for each of the measured poses in dependence of said calculated differences between the measured poses on the reference work object and on the processed real work object, saving the adjusted local fine tuning coordinate systems for the poses, and producing one or more new program instructions for the pose, based on the adjusted local fine tuning coordinate systems for the poses.

14. A method according to claim 1, wherein the desired pose is obtained by measuring on a reference object having a desired geometry.

15. A computer program product for fine tuning of a robot program for a robot application comprising an industrial robot, a tool and a work object to be processed by the tool along a path comprising a number of desired poses on the work object, the robot program comprises a number of program instructions containing programmed poses corresponding to the desired poses, wherein the computer program product comprises program instructions which, when loaded into a computer, causes the computer to perform:
    a) receiving the programmed poses,
    b) receiving information about a fine tuning coordinate system,
    c) selecting one of said programmed poses,
    d) calculating said selected pose in the fine tuning coordinate system,
    e) producing one or more program instructions for said selected pose in the fine tuning coordinate system,
    j) ordering execution of said one or more program instructions, thereby moving the robot to said selected pose,
    f) determining the difference between the obtained pose and the desired pose,
    g) adjusting the fine tuning coordinate system in dependence of said difference, so that the obtained pose approaches the desired pose,
    h) saving the adjusted fine tuning coordinate system as a local fine tuning coordinate system for the selected pose, and
    i) producing one or more program instructions for said selected pose in the adjusted fine tuning coordinate system,
    j) repeating the steps c–i for at least one more of the programmed poses.

16. A computer program product according to claim 15, comprising: saving the adjusted fine tuning coordinate system as a local fine tuning coordinate system for the selected pose, and repeating the steps c–i for a following pose on the path, wherein the local fine tuning coordinate system for the previous pose is used as a fine tuning coordinate system for the following path in step d, e and g.

17. A computer program product according to claim 15, comprising: receiving measurements of the obtained pose or the desired pose, and determining the difference between the obtained pose and the desired pose by calculating the difference between said measurements and the programmed pose.

18. A computer program product according to claim 17, comprising: receiving measurements of the obtained pose from a positioning measuring unit, and determining the difference between the obtained pose and the desired pose by calculating the difference between said measurements of the obtained pose and the programmed pose.

19. A computer program product according to claim 17, comprising: receiving the robot pose after executing said instructions, and determining the difference between the obtained pose and the desired pose by calculating the difference between said received robot pose and the programmed pose.

20. A computer readable medium having a program recorded thereon for fine tuning a robot program, where the program is to make a computer perform the steps of the program in claim 15, when said program is run on the computer.

* * * * *